April 17, 1945.  H. H. RADDE ET AL  2,374,132

SEED DISPENSING MECHANISM

Original Filed Aug. 13, 1941

Inventors
HENRY H. RADDE
WILLIAM A. RADDE

By Irving R. McCathran
Attorney

UNITED STATES PATENT OFFICE 2,374,132

SEED DISPENSING MECHANISM

Henry H. Radde and William A. Radde,
Bay City, Mich.

Original application August 13, 1941, Serial No. 406,678. Divided and this application February 24, 1943, Serial No. 476,954

1 Claim. (Cl. 222—218)

This invention relates to a seed dispensing mechanism, and has for one of its objects the production of a simple and efficient means for dropping single seeds at any given distance of rows or hills, and for spreading fertilizer in any given amount.

A further object of this invention is the production of seed dispensing mechanism which is especially designed for planting sugar-beet seed, but which may also be used for planting other seed such as corn, peas, beans, and the like.

Other objects and advantages of the present invention will appear throughout the following specification and claim.

This application is a divisional application from our previous application relating to a Sugar beet seed drill and fertilizer attachment, filed August 13, 1941, Serial Number 406,678, now Patent Number 2,354,541.

Figure 1:
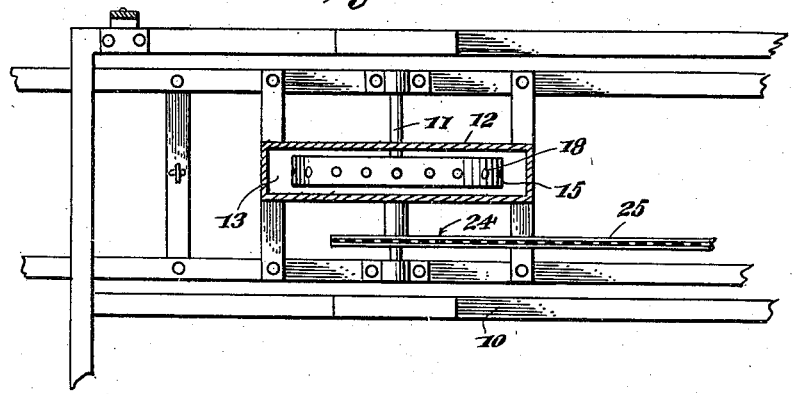
Figure 1 is a fragmentary top plan view of a portion of the supporting frame showing the seed dispensing mechanism in position, the hopper being shown in horizontal section.

By referring to the drawing it will be seen that 10 designates the main frame which carries a transverse shaft 11. A hopper 12 is carried by the frame 10 and the shaft 11 passes transversely therethrough. The hopper 12 is provided with a seeder wheel chamber 13 at its lower end, and a seeder shoe 14 extends from this chamber 13 below the seeder wheel 15. The seeder wheel 15 is rotatably mounted at the lower end of the chamber 13, and is provided with an annular flange 16. This flange 16 is provided with radial seed-receiving apertures or pockets 17 extending from the periphery and through the flange 16. Headed seed ejector pins 18 are slidably mounted in the apertures 17, the heads of the pins limiting the movement of the pins in one direction. A stationary circular plate 19 is fixed to the shaft 11 and this plate 19 is supported inwardly of the annular flange 16 by a bracket 20. A roller 21 is carried within a notch 22 formed in the bottom edge of the circular plate 19 just above the shoe 14 and in a position to provide rolling contact with the inner ends or heads of the headed pins 18 as they pass under the roller 21.

As the wheel 15 rotates, the seed, one or more at a time, will drop into the apertures 23, in the periphery of the wheel 15, since the pins 18 are pulled inwardly toward the center of the wheel 15 as described in the following. As the wheel 15 rotates in the direction of the arrow in Figure 2, and as the headed pins 18 come in contact with the roller 21, these pins 18 will be forced outwardly toward the periphery of the wheel 15 and the seed will drop down through the shoe 14. The wheel 16 is carried by the shaft 11 and is driven by an integral sprocket 24 over which sprocket 24 passes a driving chain 25. This chain 25 may be driven from any suitable source of power. A cradle 12ª is suspended from the hopper 12 and carries the shoe 14, the cradle 12ª acting as a track-way for the lower portion of the periphery of the wheel 15.

Figure 2:
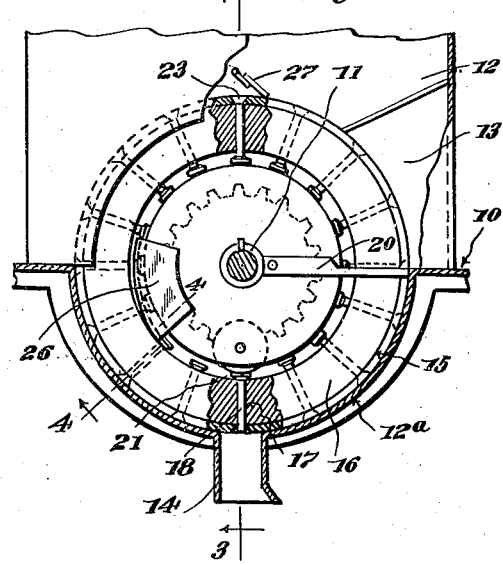
Figure 2 is a side elevational view of the seed dispensing mechanism, certain parts being shown in vertical section.
Figure 3:
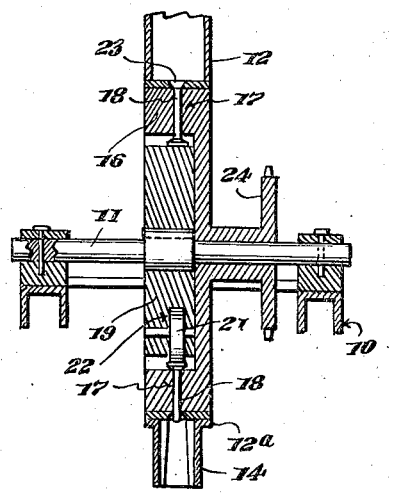
Figure 3 is a vertical sectional view taken on line 3—3 of Figure 2.
Figure 4:
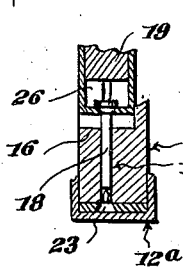
Figure 4 is an irregular sectional view taken on line 4—4 of Figure 2.

A split cam shoe 26 is carried by the plate 19 and is adapted to straddle and engage the pins 18 under the heads thereof, as the pins 18 pass longitudinally of the shoe 26. The shoe 26 will pull these pins 18 inwardly in the manner shown in Figures 2 and 4, to provide seed pockets in the outer ends of the apertures 17. The positive inward pulling of the pins 18 by the shoe 26 will prevent the pins 18 from sticking in the apertures 17 and thereby insure the entrance of seed into the outer ends of the apertures 17. A wiper gate 27 is hinged above the upper end of the flange 16, as shown in Figure 2, to wipe the outer edges of the flange 16, as the wheel 15 rotates to direct the seed from the hopper 13 into the apertures 23.

From the foregoing description it will be seen that a very simple and efficient machine has been provided for dropping single seeds in any given distance of rows or hills, depending upon the spacing of the seed-receiving apertures within the wheel 15 and the speed at which the wheel is driven. Through the medium of the present device, seed may be saved for the reason that the seed may be economically and evenly distributed, considerable labor will be saved by eliminating blocking and thinning as is usual with many planters now in use.

It should be understood that the shoe 26 and the heads of the pins 18 may be constructed in any suitable manner to facilitate the withdrawing of the pins 18, by the shoe 26. For instance, the under face of the heads of the pins 18 may be beveled and the forward edge of the shoe 26 may be sharpened to fit under the heads of the pins to withdraw the pins 18 as the pins 18 pass the shoe 26.

Suitable detail changes may be made without departing from the spirit of the invention.

Having described the invention, what is claimed is:

A machine of the class described comprising a frame, a seeder means comprising a hopper, a seeder wheel carried by the lower end of said hopper, said seeder wheel having seed-receiving pockets for receiving seed when the wheel is in one position, headed pins fitted in said pockets, a roller contacting said headed pins for moving the pins outwardly of the pockets and forcibly ejecting seed from the pockets when the wheel is in another selected position, and a stationary cam shoe having inturned flanges fitting under said headed pins for positively and forcibly pulling the pins inwardly of said pockets as said wheel rotates to a predetermined position.

HENRY H. RADDE.
WILLIAM A. RADDE.